United States Patent
Fodor et al.

(10) Patent No.: US 11,265,916 B2
(45) Date of Patent: Mar. 1, 2022

(54) SIDELINK ASSISTED COOPERATIVE LISTEN-BEFORE-TALK

(71) Applicant: Telefonaktiebolaget LM Ericsson (publ), Stockholm (SE)

(72) Inventors: Gabor Fodor, Hässelby (SE); Håkan Björkegren, Täby (SE); Fredrik Gunnarsson, Linköping (SE); Jonas Kronander, Knivsta (SE); Bo Lincoln, Lund (SE); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 16/330,912

(22) PCT Filed: Oct. 31, 2016

(86) PCT No.: PCT/SE2016/051064
§ 371 (c)(1),
(2) Date: Mar. 6, 2019

(87) PCT Pub. No.: WO2018/080365
PCT Pub. Date: May 3, 2018

(65) Prior Publication Data
US 2019/0261413 A1    Aug. 22, 2019

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 76/14* (2018.02); *H04W 88/04* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2011/0228666 A1* | 9/2011 | Barbieri | H04W 76/14 370/216 |
| 2012/0015607 A1* | 1/2012 | Koskela | H04W 76/14 455/62 |

(Continued)

FOREIGN PATENT DOCUMENTS

| | | |
|---|---|---|
| EP | 3443803 A1 | 11/2017 |
| WO | 2015116159 A1 | 8/2015 |

OTHER PUBLICATIONS

"New Work Item on Further Enhancements to Licensed-Assisted Access Using LTE", 3GPP TSG RAN Meeting #73 RP-161705; New Orleans, USA, Sep. 19-22, 2016, pp. 1-8.
(Continued)

*Primary Examiner* — Hong Shao
(74) *Attorney, Agent, or Firm* — Sage Patent Group

(57) ABSTRACT

Systems and methods are disclosed herein that relate to the use of a Device-to-Device (D2D) sidelink, e.g., in a licensed spectrum, to assist with clear channel assessment in an unlicensed spectrum. In doing so, the hidden node problem and/or the exposed node problem can be mitigated. In some embodiments, a method of operation of a wireless device in a cellular communications network comprises performing a sidelink-assisted clear channel assessment (SLA-CCA) procedure to determine whether to transmit on an unlicensed channel. The SLA-CCA procedure is a Clear Channel Assessment (CCA) procedure that is assisted by information received by the wireless device from one or more other wireless devices over a D2D sidelink in a licensed spectrum. The method further comprises, upon determining to transmit on the unlicensed channel as a result of performing the SLA-CCA procedure, transmitting a transmission on the unlicensed channel.

15 Claims, 9 Drawing Sheets

(51) Int. Cl.
  *H04W 92/18* (2009.01)
  *H04W 88/04* (2009.01)
  *H04W 76/14* (2018.01)

(56) References Cited

U.S. PATENT DOCUMENTS

2015/0373730 A1* 12/2015 Fujishiro ............... H04L 1/0025
                                                   455/450
2017/0202043 A1*  7/2017 Seo ....................... H04W 76/14
2017/0339530 A1* 11/2017 Maaref ................. H04L 5/0033

OTHER PUBLICATIONS

Lei, Lei, et al., "Operator Controlled Device-to-Device Communications in LTE-Advanced Networks", IEEE Wireless Communications, Jun. 2012, pp. 96-104.
European Office Action dated Jun. 29, 2020 for European Patent Application No. 16797669.5, 7 pages.

* cited by examiner

SIDELINK ASSISTED COOPERATIVE LISTEN-BEFORE-TALK

TECHNICAL FIELD

The present disclosure relates to wireless communication in an unlicensed spectrum and, in particular, to augmenting Clear Channel Assessment (CCA), or Listen-Before-Talk (LBT), with information transmitted on a Device-to-Device (D2D) sidelink to, e.g., mitigate the hidden node problem and/or the exposed node problem.

BACKGROUND

Listen-Before-Talk (LBT) and Carrier Sense Multiple Access (CSMA)

In wireless networks operating in unlicensed spectrum, multiple nodes may access the wireless medium simultaneously without the arbitration of a central entity. In such situations, a distributed Medium Access Control (MAC) mechanism can help the wireless nodes to coordinate the access and provide an arbitration mechanism such that each node can transmit its packet with low probability of packet collisions. Examples of such mechanisms are the CSMA and LBT protocols employed by wireless technologies operating in unlicensed spectrum.

For Long Term Evolution (LTE) systems deployed in unlicensed spectrum, using the LBT protocol enables coexistence with, for example, IEEE wireless networks, i.e., WiFi networks, using CSMA based MAC. LTE systems employing LBT do not degrade the performance of the IEEE system more than if an additional IEEE network was deployed in the same frequency band. Thus, LBT and CSMA are important mechanisms in environments of mixed wireless technologies.

A well-known problem associated with CSMA and LBT protocols is the hidden node problem illustrated in FIG. 1. The hidden node problem may lead to packet collisions at the receiver and thereby throughput degradations and instability of the system. In the illustrated example, a first User Equipment device (UE-A) has an ongoing transmission in the unlicensed band. A second UE (UE-B) is far enough from UE-A that UE-B does not sense the transmission of UE-A when performing CSMA/LBT and, as such, UE-B also begins transmitting in the unlicensed band. As a result, there is packet collision at the intended receiver, which results in a degradation in throughput and instability of the system.

Another problem in CSMA and LBT systems is the so called exposed node problem illustrated in FIG. 2. An exposed node senses the channel busy when it is close to a wireless transmitter and refrains from transmission even when its intended receiver node is interference free. In the illustrated example, there is an ongoing transmission from UE-A to base station A (BS-A) in the unlicensed band. UE-B desires to transmit in the unlicensed band to BS-B. However, during CSMA/LBT, UE-B detects the transmission from UE-A (i.e., senses energy in the channel) and therefore determines that the channel is busy. However, this may be an undesirable result because the intended receiver for UE-B is different than the intended receiver for the transmission from UE-A. In other words, it is possible that UE-B could have transmitted to BS-B in the unlicensed band without causing interference to the transmission from UE-A to BS-A. This depends, e.g., on the pathloss experienced between the UEs and the BSs.

A consequence of the hidden and exposed node problems is a throughput degradation due to retransmissions and delayed transmissions. Also, the overall load in terms of transmitted packets and served UEs that the system can handle without diverging packet delivery times can be severely degraded. Recognizing the importance of solving the hidden and exposed node problems, existing technologies provide wireless protocols such as, e.g., those based on Ready to Send (RTS) and Clear to Send (CTS) signaling that help mitigate these problems at the expense of extra complexity and protocol overhead.

License Assisted Access (LAA) in Unlicensed Spectrum

Currently, unlicensed frequency bands provide the possibility to enhance the capacity of cellular networks operating solely in licensed bands. To this end, existing and currently standardized technologies such as Third Generation Partnership Project (3GPP) LTE-Unlicensed (LTE-U) and LAA provide mechanisms by means of which LTE UEs can access the unlicensed spectrum bands without implementing IEEE technologies. Such UEs must adhere to regulations that facilitate the coexistence of 3GPP and IEEE technologies in the same frequency bands. UEs implementing LAA and LTE-U protocols must comply with various regulatory requirements concerning the employed duty cycle, transmit power levels, and medium access mechanisms, such as carrier sensing and Clear Channel Assessment (CCA) so that a fair sharing of the wireless medium by multiple technologies is achieved.

The primary objective of LTE-U and LAA technologies is increasing the capacity in scenarios in which LTE networks operating in licensed bands are deployed. Public indoor deployments, outdoor hotspots, or corporate environments, for example, can benefit from such capacity enhancements.

Device-to-Device (D2D) Communications in Licensed (Cellular) Spectrum and the LTE Sidelink (SL)

Cellular network-controlled short range communications and the integration of adhoc networking in cellular networks have been the topic of research since the late 1990's. It has been found that short-range communication can take advantage of a cellular control layer in distributing content between mobile users relying on unlicensed spectrum resources in a peer-to-peer fashion. In 3GPP Release 12, D2D communications, or Proximity Services (ProSe) communication, is limited to the public safety usage. According to the associated requirements, ProSe communication has to work in regions where network coverage cannot be guaranteed. Therefore, ProSe communication is specified for in-coverage, partial coverage, and out-of-coverage scenarios.

In LTE, D2D communications are made possible by transmitting and receiving control signaling and user data on a "sidelink," which is referred to herein as a D2D SL or simply as a SL. The SL complements the communication services that use the conventional uplink and downlink. Specifically, 3GPP has specified Physical Layer (PHY) channels, including the PHY SL Shared Channel (PSSCH) and the PHY SL Broadcast Channel (PSBCH), to transmit data to a specific peer device and to broadcast user data to a set of peer devices using the SL physical resources. Currently, the SL PHY resources are a subset of the cellular uplink resources. In future (Fifth Generation (5G)) networks, it can be expected that SLs will use both cellular uplink and downlink PHY resources.

Problems with Existing Solutions

CSMA/LBT schemes, which are generally referred to herein as CCA schemes, are needed for cellular communications networks such as LTE-U and/or LAA networks operating in unlicensed frequency bands. However, current CCA schemes still suffer from the hidden node and exposed node problems. As such, there is a need for systems and methods that address the hidden node problem and/or the exposed node problem, particularly in a cellular communications system that utilizes unlicensed spectrum.

SUMMARY

Systems and methods are disclosed herein that relate to the use of a Device-to-Device (D2D) sidelink, e.g., in a licensed spectrum, to assist with Clear Channel Assessment (CCA) in an unlicensed spectrum. In doing so, the hidden node problem and/or the exposed node problem can be mitigated. In some embodiments, a method of operation of a wireless device in a cellular communications network comprises performing a Sidelink (SL)-Assisted CCA (SLA-CCA) procedure to determine whether to transmit on an unlicensed channel. The SLA-CCA procedure is a CCA procedure that is assisted by information received by the wireless device from one or more other wireless devices over a D2D SL in a licensed spectrum. The method further comprises, upon determining to transmit on the unlicensed channel as a result of performing the SLA-CCA procedure, transmitting a transmission on the unlicensed channel.

In some embodiments, the method further comprises, upon determining to transmit on the unlicensed channel as a result of performing the SLA-CCA procedure, transmitting a message on a D2D SL, where the message comprises an indication that the wireless device is using the unlicensed channel. Further, in some embodiments, the message further comprises an indication of an intended receiver of the transmission by the wireless device in the unlicensed channel. In some embodiments, the message further comprises an estimate of a pathloss between the wireless device and the intended receiver of the transmission by the wireless device in the unlicensed channel.

In some embodiments, the message comprises at least one of: a status of the unlicensed channel as sensed by the wireless device, an indication of a maximum power at which the wireless device will transmit for the transmission on the unlicensed channel; a synchronization or reference signal; a persistency level that the wireless device uses for CCA; an indication of a duration of the transmission by the wireless device on the unlicensed channel; a packet length for the transmission by the wireless device on the unlicensed channel; and a position of the wireless device.

In some embodiments, the method further comprises, upon determining not to transmit on the unlicensed channel as a result of performing the SLA-CCA procedure, refraining from transmitting on the unlicensed channel.

In some embodiments, performing the SLA-CCA procedure comprises attempting to detect a message from another wireless device on the D2D SL that indicates that another wireless device is using the unlicensed channel. Performing the SLA-CCA procedure further comprises, upon detecting a message from another wireless device on the D2D SL, determining at least one impact related to transmission on the unlicensed channel by the wireless device. The at least one impact is at least one of: an impact of transmission on the unlicensed channel by the wireless device on reception of a transmission on the unlicensed channel by the other wireless device at an intended receiver of the transmission by the other wireless device and an impact of the transmission on the unlicensed channel by the other wireless device indicated by the detected message on reception of a transmission on the unlicensed channel by the wireless device at an intended receiver of the transmission by the wireless device. Performing the SLA-CCA procedure further comprises determining whether the at least one impact is less than a predefined or preconfigured threshold such that the wireless device determines to transmit in the unlicensed channel upon determining that the at least one impact is less than the predefined or preconfigured threshold. Further, in some embodiments, performing the SLA-CCA procedure further comprises, upon not detecting a message from another wireless device on the D2D SL, performing a CCA on the unlicensed channel and determining, based on a result of the CCA, whether the unlicensed channel is clear such the wireless device determines to transmit in the unlicensed channel upon determining that the unlicensed channel is clear.

Further, in some embodiments, determining the at least one impact comprises determining or obtaining at least one of: a first pathloss between the wireless device and the other wireless device on the unlicensed channel; a second pathloss between the wireless device and the intended receiver of the transmission from the other wireless device in the unlicensed channel; a third pathloss between the other wireless device and the intended receiver of the transmission from the other wireless device in the unlicensed channel; and a fourth pathloss between the wireless device and the intended receiver of the transmission from the wireless device in the unlicensed channel. Determining the at least one impact further comprises determining the at last one impact related to transmission on the unlicensed channel by the wireless device based on the at least one of the first pathloss, the second pathloss, the third pathloss, and the fourth pathloss.

In some embodiments, the method further comprises, upon determining that the at least one impact is not below the predefined or preconfigured threshold, refraining from transmitting the transmission on the unlicensed channel. In some embodiments, the method further comprises, upon determining that the at least one impact is below than the predefined or preconfigured threshold, taking one or more further actions. The one or more further actions comprises at least one of: requesting that the other wireless device reduce its transmit power; requesting that the other wireless device reduce its persistency level; and initiating a cell reselection or handover for the wireless device.

Embodiments of a wireless device for a cellular communications network are also disclosed. In some embodiments, a wireless device for a cellular communications network is adapted to perform a SLA-CCA procedure to determine whether to transmit on an unlicensed channel. The SLA-CCA procedure is a CCA procedure that is assisted by information received by the wireless device from one or more other wireless devices over a D2D SL in a licensed spectrum. The wireless device is further adapted to, upon determining to transmit on the unlicensed channel as a result of performing the SLA-CCA procedure, transmit a transmission on the unlicensed channel. In some embodiments, the wireless device is further adapted to operate according to any one of the embodiments of a method of operation of a wireless device disclosed herein.

In some embodiments, a wireless device for a cellular communications network comprises a transceiver, at least one processor, and memory comprising instructions executable by the at least one processor whereby the wireless device is operable to perform a SLA-CCA procedure to determine whether to transmit on an unlicensed channel and, upon determining to transmit on the unlicensed channel as a result of performing the SLA-CCA procedure, transmit a transmission on the unlicensed channel. The SLA-CCA procedure is a CCA procedure that is assisted by information received by the wireless device from one or more other wireless devices over a D2D SL in a licensed spectrum.

In some embodiments, by execution of the instructions by the at least one processor, the wireless device is further operable to, upon determining to transmit on the unlicensed channel as a result of performing the SLA-CCA procedure, transmit a message on a D2D SL, the message comprising an indication that the wireless device is using the unlicensed channel.

In some embodiments, in order to perform the SLA-CCA procedure, the wireless device is operable to attempt to detect a message from another wireless device on the D2D SL that indicates that another wireless device is using the unlicensed channel and, upon detecting a message from another wireless device on the D2D SL, determine at least one impact related to transmission on the unlicensed channel by the wireless device. The at least one impact is at least one of an impact of transmission on the unlicensed channel by the wireless device on reception of a transmission on the unlicensed channel by the other wireless device at an intended receiver of the transmission by the other wireless device and an impact of the transmission on the unlicensed channel by the other wireless device indicated by the detected message on reception of a transmission on the unlicensed channel by the wireless device at an intended receiver of the transmission by the wireless device. In order to perform the SLA-CCA procedure, the wireless device is further operable to determine whether the at least one impact is less than a predefined or preconfigured threshold such that the wireless device determines to transmit in the unlicensed channel upon determining that the at least one impact is less than the predefined or preconfigured threshold.

Further, in some embodiments, in order to perform the SLA-CCA procedure, the wireless device is further operable to, upon not detecting a message from another wireless device on the D2D SL, perform a CCA on the unlicensed channel and determine, based on a result of the CCA, whether the unlicensed channel is clear such the wireless device determines to transmit in the unlicensed channel upon determining that the unlicensed channel is clear.

In some embodiments, in order to determine the at least one impact, the wireless device is further operable to determine or obtain at least one of a first pathloss between the wireless device and the other wireless device on the unlicensed channel, a second pathloss between the wireless device and the intended receiver of the transmission from the other wireless device in the unlicensed channel, a third pathloss between the other wireless device and the intended receiver of the transmission from the other wireless device in the unlicensed channel, and a fourth pathloss between the wireless device and the intended receiver of the transmission from the wireless device in the unlicensed channel. In order to determine the at least one impact, the wireless device is further operable to determine the at least one impact related to transmission on the unlicensed channel by the wireless device based on the at least one of the first pathloss, the second pathloss, the third pathloss, and the fourth pathloss.

In some embodiments, by execution of the instructions by the at least one processor, the wireless device is further operable to, upon determining that the at least one impact is not less than the predefined or preconfigured threshold, refrain from transmitting the transmission on the unlicensed channel.

In some embodiments, a wireless device for a cellular communications network comprises a performing module and a transmitting module. The performing module is operable to perform a SLA-CCA procedure to determine whether to transmit on an unlicensed channel. The he SLA-CCA procedure is a CCA procedure that is assisted by information received by the wireless device from one or more other wireless devices over a D2D SL in a licensed spectrum. The transmitting module is operable to, upon determining to transmit on the unlicensed channel as a result of performing the SLA-CCA procedure, transmit a transmission on the unlicensed channel.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
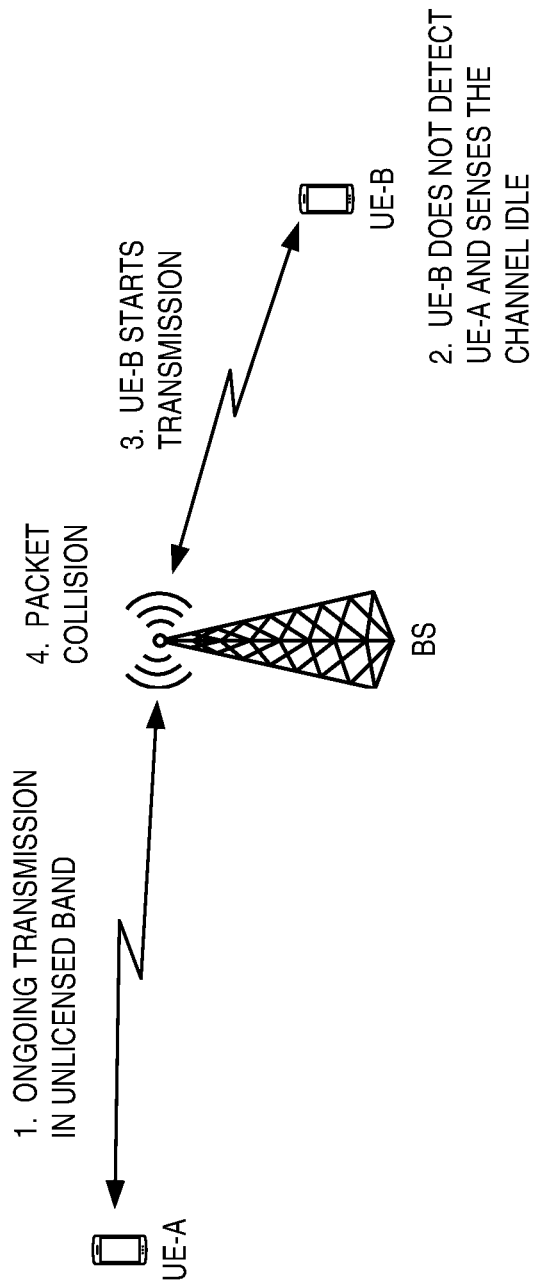
FIG. 1 illustrates the hidden node problem.
Figure 2:
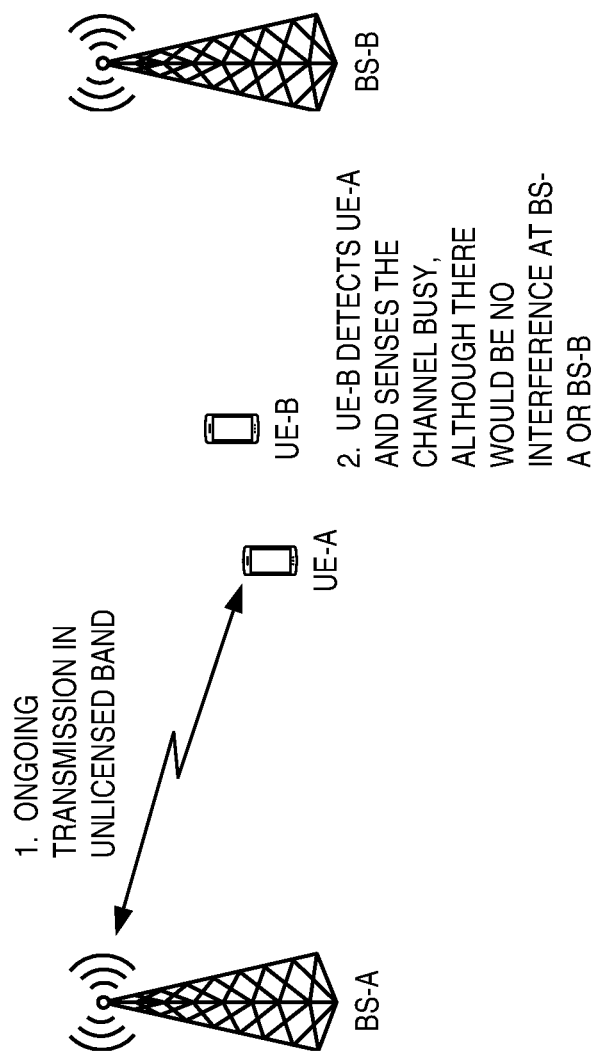
FIG. 2 illustrates the exposed node problem.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., can be served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

The present disclosure relates to scenarios in which a cellular communications network (e.g., an LTE network) operates in licensed spectrum bands and capacity enhancement is provide by utilizing unlicensed spectrum resources. In some embodiments, operation in the unlicensed spectrum is provided using 3GPP LTE in the unlicensed band (LTE-U) or License Assisted Access (LAA) technology. LTE-U enables standalone operation in unlicensed spectrum whereas LAA enables operation in the unlicensed band using Carrier Aggregation (CA) with, e.g., a Primary Cell (PCell) in a licensed band and one or more Secondary Cells (SCells) in an unlicensed band. The description provided herein focuses on the case where UEs implement a Clear Channel Assessment (CCA) scheme (e.g., Carrier Sensing (CS) or Listen-Before-Talk (LBT)) before transmitting in an unlicensed band, but it is easily understood by the skilled person that the concepts disclosed herein are applicable when radio access nodes, or more generally wireless access points, use a CCA scheme before transmitting in an unlicensed band.

To comply with regulations and achieve high throughput, UEs use a CCA scheme such as, e.g., a Carrier Sense Multiple Access (CSMA) or LBT medium access protocol before transmitting in an unlicensed band and have capabilities and access rights to spectrum resources licensed to a cellular communications network such as, e.g., an LTE network. In other words, embodiments disclosed herein are applicable in situations in which UEs have multiple Radio Access Technology (multi-RAT) capability, i.e., the UEs have the capability to access both licensed and unlicensed spectrum.

Embodiments are described herein that relate to the use of Device-to-Device (D2D) Sidelink (SL) signals in the licensed spectrum to exchange information about, e.g., the status of an unlicensed channel(s) in an unlicensed spectrum. The information communicated by the D2D SL signals in the licensed spectrum assist UEs in determining whether the UEs can access the unlicensed channel(s) without negatively impacting, e.g., reception of a transmission by another UE on the unlicensed channel(s). Embodiments of the present disclosure take advantage of the capability of transmitting and receiving signals on the D2D SL in the licensed spectrum to assist transmission in unlicensed spectrum and mitigate the problems of hidden and exposed nodes. Note that while the embodiments described herein focus on the use of the D2D SL in the licensed spectrum, the D2D SL may alternatively be transmitted in a dedicated channel(s) in an unlicensed spectrum that do not require CCA.

Figure 3:
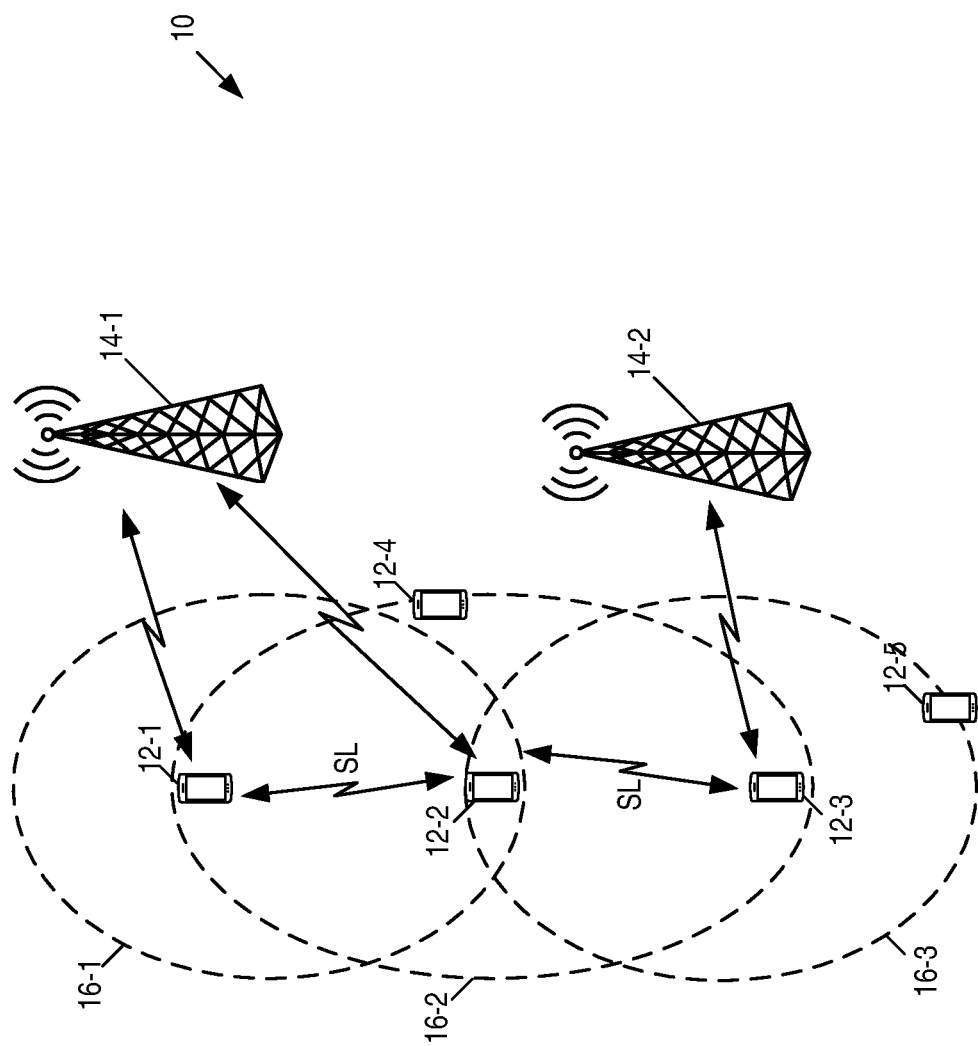
FIG. 3 illustrates one example of a cellular communications network, or more generally a wireless system, in which embodiments of the present disclosure may be implemented.

In this regard, FIG. 3 illustrates one example of a cellular communications network 10, or more generally a wireless system, in which embodiments of the present disclosure may be implemented. As illustrated, a number of UEs 12, or more generally wireless devices, wirelessly transmit signals to and receive signals from base stations 14 (e.g., eNBs), or more generally radio access nodes. In this example, there are several UEs 12, which are specifically referred to as UEs 12-1 through 12-5, and there are two base stations 14, which are specifically referred to as base stations 14-1 and 14-2. The base stations 14 are connected to a core network (not shown). The base stations 14 each serve one or more cells. The cells include cells operating in licensed spectrum as well as cells operating in unlicensed spectrum. For example, for LAA, a base station 14 may serve one or more cells in licensed spectrum and one or more cells in unlicensed spectrum, where, for a particular UE 12, one of the cells is configured as the PCell of the UE 12, one or more other cells in the licensed spectrum may be configured as SCells of the UE 12, and one or more of the cells in the unlicensed spectrum may be configured as an SCell of the UE 12. For LTE-U and similar technologies such as MulteFire, both the PCell and any SCells of the UE 12 are operated in the unlicensed spectrum.

The UEs 12 are also capable of D2D communication with other UEs 12 within their respective D2D coverage areas 16 on a D2D SL in a licensed spectrum (e.g., the licensed uplink band for the cellular communications network 10 or the licensed downlink band for the cellular communications network 10). The D2D SL is, in some embodiments, the SL defined in 3GPP standards or any future variation thereof. As used herein, a D2D coverage area 16 is an area in which the UE 12 can communicate with other UEs 12 via the D2D SL.

As described below in detail, according to embodiments of the present disclosure, a UE 12 transmits a message, which is referred to herein as a "start transmitting" message, on the D2D SL, where this message includes an indication that the UE 12 is using an unlicensed channel(s) (i.e., a channel(s) in the unlicensed spectrum). Note that the terms "licensed spectrum" and "licensed band" are used interchangeably herein. Likewise, the terms "unlicensed spectrum" and "unlicensed band" are used interchangeably herein. In some embodiments, the unlicensed spectrum is logically divided into two or more unlicensed channels, in which case the start transmitting message indicates which unlicensed channel(s) in the unlicensed spectrum are busy. In other embodiments, the unlicensed spectrum can be viewed as a single unlicensed channel such that the start transmitting message is an indication that the unlicensed channel is busy. The start transmitting message transmitted on the D2D SL by one UE 12 enables other UEs 12 that detect the message to utilize the message when determining whether to transmit on the unlicensed channel(s). In other words, the other UEs 12 perform what is referred to herein as a SL-Assisted CCA (SLA-CCA) procedure that determines, based on any detected start transmitting message(s) received on the D2D SL, whether to transmit on the unlicensed channel(s).

Figure 4:
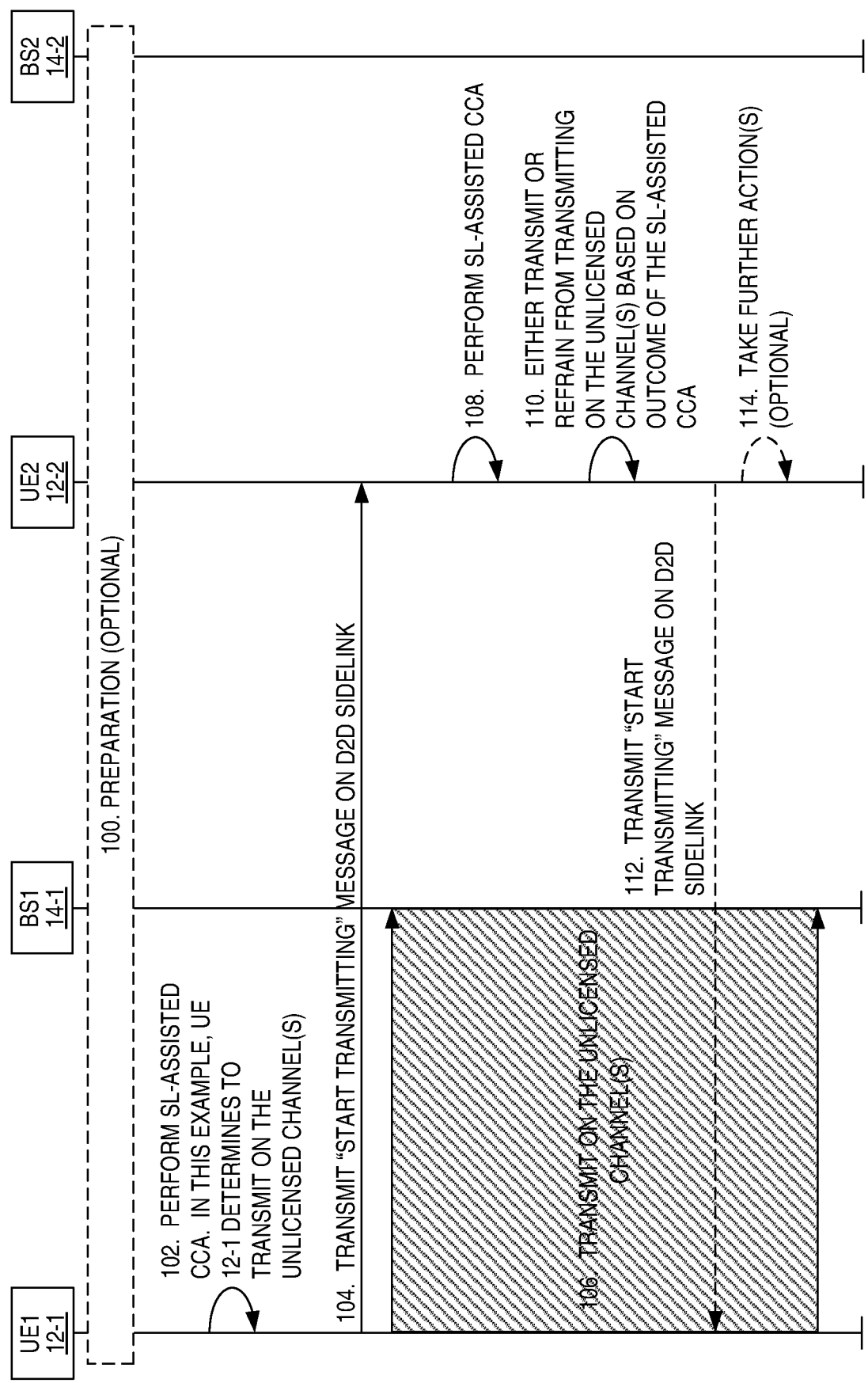
FIG. 4 illustrates the operation of the system of FIG. 3 according to some embodiments of the present disclosure.

In this regard, FIG. 4 illustrates the operation of the cellular communications network 10 of FIG. 3 according to some embodiments of the present disclosure. Optionally (i.e., in some embodiments), the UEs 12 and the base stations 14 communicate to prepare for operation (step 100). For example, D2D SL resources may be requested by, e.g., the UE 12-1 and granted by the base station 14-1. The granted SL resources may then be communicated to the other UEs 12 directly from the base station 14-1 or indirectly via their respective serving base stations 14. As one example alternative, the base stations 14 may periodically broadcast an indication of SL resources that can be used by the UEs 12 to transmit start transmitting messages as described herein.

Note that the D2D SL resources can be specific for, i.e., dedicated for, the transmission of start transmitting messages as described herein or can be the same/overlapping D2D SL resources used for regular D2D SL communications or discovery. The preparation step may also include signaling/broadcasting some other parameters associated with the SL resources used for the signaling of start transmitting messages, such as the maximum transmit power level used on these resources, modulation and coding scheme or some preamble that identifies the message type (e.g., information type A-I in the list below or some combination thereof) that the UE 12 sends when using these resources.

In operation, when, in this example, the UE 12-1 has data to transmit to its serving base station 14-1 in the unlicensed spectrum, the UE 12-1 performs a SLA-CCA procedure (step 102). While the details are described below, the UE 12-1 determines whether it has detected, or received, a start transmitting message(s) from another UE(s) 12. If the UE 12-1 has not received any start transmitting message(s), the UE 12-1 performs a CCA procedure (e.g., a LBT or CSMA procedure) to determine whether an unlicensed channel(s) on which the UE 12-1 desires to transmit is clear and decides to transmit if the unlicensed channel(s) is clear. However, if the UE 12-1 has detected a start transmitting message on the D2D SL from another UE 12, the UE 12-1 determines whether the UE 12-1 should transmit on the unlicensed channel(s) based on the received start transmitting message(s). In this example, the UE 12-1 determines to transmit on the unlicensed channel(s).

Upon determining to transmit on the unlicensed channel (s), the UE 12-1 transmits a start transmitting message on the D2D SL (step 104). The start transmitting message may be transmitted to a specific UE(s) 12, such as the UE 12-2, or may be broadcast to all other UEs 12. In other words, the start transmitting message may be a dedicated point-to-point transmission on the D2D SL to a specific UE(s) 12 or a broadcast message on the D2D SL. In general, the start transmitting message includes an indication that the UE 12-1 is using the unlicensed channel(s) (i.e., accessing the medium). As used herein, "using the channel" means that the UE 12-1 is already transmitting on the unlicensed channel(s) or is about to start transmitting on the unlicensed channel(s). The start transmitting message may further include one or more of the following:

A: A channel status for the unlicensed channel(s) as sensed by the UE 12-1 during its CCA. The channel status can be an instantaneous channel status or a summary of the channel status during a defined time window W. The channel status can be binary (i.e., free/busy) or finer grained (e.g., Received Signal Strength Indicator (RSSI), percentage of time the channel is busy, etc.);

B: An indication of an intended receiver, i.e., an intended destination, of the transmission by the UE 12-1 on the unlicensed channel(s);

C: An estimate made by the UE 12-1 of the pathloss, or distance, to the intended receiver of the transmission by the UE 12-1 on the unlicensed channel(s). In this example, the intended receiver is the base station 12-1 and, as such, the pathloss is the pathloss between the UE 12-1 and the base station 14-1;

D: An indication of a maximum power that the UE 12-1 will use in upcoming transmissions on the unlicensed channel(s);

E: Synchronization/reference signal;

F: Persistency level ($\rho$), or persistence level, that the UE 12-1 uses in its CCA where, e.g., the CCA is a CSMA procedure;

G: An indication of a duration of that that the UE 12-1 will be using the unlicensed channel(s). This indication may be, e.g., a packet length of the transmission that the UE 12-1 is transmitting on the unlicensed channel(s);

H: Position information that indicates a position of the UE 12-1;

I: An indication of the resource(s) in the unlicensed spectrum being used by the UE 12-1. The resource(s) may include, e.g., unlicensed channel(s), specific time resources (e.g., System Frame Number(s) (SFN(s)), and/or the like). For example, in scenarios in which the unlicensed spectrum includes two or more unlicensed channels, an indication the unlicensed channel(s) being used by the UE 12-1 and, optionally, an indication of the time resources (e.g., time window, SFNs, or the like) during which the UE 12-1 is using the indicated unlicensed channel(s).

The start transmitting message may include additional or alternative information depending on the particular embodiment and implementation.

Upon determining to transmit in the unlicensed channel (s), the UE 12-1 also starts transmitting on the unlicensed channel(s) (step 106). Note that while the transmission of the start transmitting message is illustrated as being before the start of the transmission in the unlicensed channel(s), the present disclosure is not limited thereto. The UE 12-1 may transmit the start transmitting message on the D2D SL before, after, or simultaneously with the start of the transmission by the UE 12-1 on the unlicensed channel(s).

In this example, at some point, the UE 12-2 desires to transmit in the unlicensed spectrum. As such, the UE 12-2 performs a SLA-CCA procedure (step 108). Note that the UEs 12-1 and 12-2 may be served by the same or different base stations 14. In this example, the UE 12-2 has received the start transmitting message from the UE 12-1 on the D2D SL and, as such, the UE 12-2 determines whether to transmit on the unlicensed channel(s) based on the received start transmitting message. Depending on the outcome, or result, of the SLA-CCA procedure, the UE 12-2 either transmits on the unlicensed channel(s) or refrains from transmitting on the unlicensed channel(s) (step 110). If the UE 12-2 transmits on the unlicensed channel, the UE 12-2 also transmits a start transmitting message on the D2D SL (step 112). Optionally, in some embodiments, upon deciding to refrain from transmitting on the unlicensed channel(s), the UE 12-2 may take a further action(s) such as, for example, requesting that the UE 12-1 decrease its transmit power on the unlicensed channel, requesting that the UE 12-1 decreases its persistency level (ρ) for its CCA, or initiating cell reselection or handover to a different base station 14 (e.g., such that the intended receiver of the UE 12-2 changes) (step 114). Such requests may, as non-limiting examples, be transmitted in a dedicated D2D message to UE 12-1, or in a broadcasted D2D message, or in a message sent to a serving BS base station of UE 12-1. In situations where such requests constitute conflicting interests between the different UEs, the common resources in terms of, e.g., used transmit power or persistency level can be divided between the UEs, for example using some predetermined set of rules, commonly known to the UEs, or by the network via the serving base station(s) adjusting the scheduling of the common resources.

Figure 5:
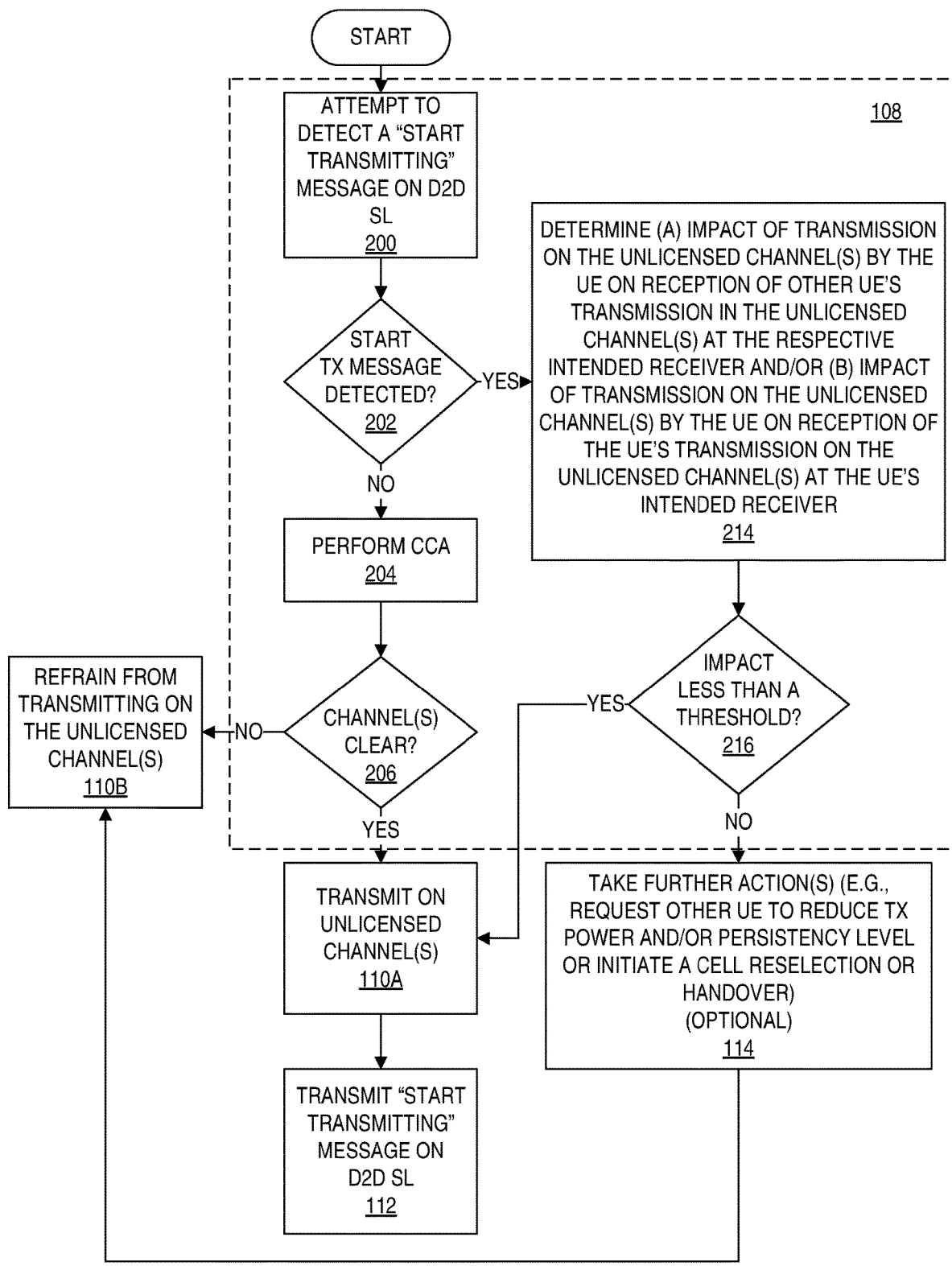
FIG. 5 is a flow chart that illustrates the operation of a wireless device to perform a Sidelink-Assisted Clear Channel Assessment (SLA-CCA) procedure according to some embodiments of the present disclosure.

FIG. 5 is a flow chart that illustrates the SLA-CCA procedure of step 108 in more detail according to some embodiments of the present disclosure. Note that this same discussion applies to the SLA-CCA procedure performed by the UE 12-1 in step 102. As illustrated, the UE 12-2 attempts to detect a start transmitting message on the D2D SL (step 200). In other words, the UE 12-2 listens for a start transmitting message on the D2D SL. At some point, either before, during, or after attempting to detect a start transmitting message on the D2D SL, the UE 12-2 desires to start transmitting in the unlicensed spectrum. As such, the UE 12-2 determines whether a start transmitting message has been received on the D2D SL (step 202). If the UE 12-2 has not received a start transmitting message on the D2D SL (step 202; NO), the UE 12-2 performs a CCA for the unlicensed channel(s) on which the UE 12-2 desires to transmit (step 204). The CCA may be, for example, a LBT procedure during which the UE 12-2 senses energy on the unlicensed channel(s) and decides that the channel is clear based on the sensed energy. The UE 12-2 determines whether the channel is clear based on a result of the CCA (step 206).

Upon determining that the channel is clear (step 206; YES), the UE 12-2 has determined to transmit on the unlicensed channel(s). As such, the UE 12-2 starts transmitting on the unlicensed channel(s) (step 110A) and transmits a corresponding start transmitting message on the D2D SL (step 112). As discussed above, the start transmitting message includes an indication that the UE 12 is using the unlicensed channel(s) and may include, in some embodiments, any one or any combination of the types of information A-I listed above. Returning to step 206, if the channel is determined to be busy (step 206; NO), the UE 12-2 has determined that the UE 12-2 is not to transmit on the unlicensed channel(s). As such, the UE 12-2 refrains from transmitting on the unlicensed channel(s) (step 110B).

Returning to step 202, if the UE 12-2 has detected a start transmitting message from another UE 12-1 on the D2D SL (step 202; YES), the UE 12-2 determines (A) an impact of a transmission by the UE 12-2 on the unlicensed channel(s) on reception of the other UE's (i.e., the other UE 12-1 from which the start transmitting message was received) transmission on the unlicensed channel(s) at the intended receiver of that transmission (i.e., the degree to which the UE's 12-2 transmission will interfere with reception of the other UE's 12-1 transmission) and/or (B) an impact of the transmission by the other UE 12-1 on the unlicensed channel(s) on reception of the transmission by the UE 12-2 on the unlicensed channel(s) at the intended receiver of the transmission of the UE 12-2 (e.g., the degree to which the transmission by the other UE 12-1 will interfere with reception of the UE's 12-2 own transmission) (step 214). In some embodiments, the impact in (A) is the degree to which the Signal to Interference plus Noise Ratio (SINR) at the intended receiver of the other UE's 12-1 transmission will be impacted by the transmission by the UE 12-2. Likewise, in some embodiments, the impact in (B) is the degree to which the SINR at the intended receiver of the UE's 12-2 transmission will be impacted, that is decreased, by the transmission by the other UE 12-1. As discussed below in detail, in both (A) and (B), the impact is determined based on pathloss or distance values determined or otherwise obtained by the UE 12-2 between the different nodes.

The UE 12-2 determines whether the determined impact, in terms of e.g. SINR degradation, is less than a predefined or preconfigured threshold (step 216). If the impact in (A) and/or (B) is represented as an estimated SINR value, then the threshold may be a preconfigured or predetermined threshold SINR value (e.g., 5 decibels (dB) or 10 dB, but these values will depend on, e.g., desired bit rate). Note that, for SINR, high values are good and low values are bad. As such, the "impact" is, e.g., the amount of SINR degradation (i.e., the amount by which SINR is decreased). Thus, when the "impact" is referred to herein as being low or below a threshold, this means that, e.g., the degradation in SINR is low or below a threshold (i.e., the reduction in SINR is small). Conversely, when the "impact" is referred to herein as being high or above a threshold, this means that, e.g., the degradation in SINR is high or above a threshold (i.e., the reduction is SINR is large). Further, the threshold for (A) may be the same as that for (B), or (A) and (B) may have separate and possibly different thresholds. Upon determining that the impact is less than the threshold (step 216; YES), the UE 12-2 proceeds to steps 110A and 112 where the UE 12-2 transmits on the unlicensed channel(s) and transmits a corresponding start transmitting message on the D2D SL. However, upon determining that the impact is greater than the threshold (step 216; NO), the UE 12-2 optionally takes one or more further actions (step 114) and refrains from transmitting on the unlicensed channel(s) (step 110B). As discussed above, the one or more further actions can include, for example, requesting that the other UE 12-1 decrease its transmit power on the unlicensed channel, requesting that the other UE 121 decreases its persistency level (ρ) for its CCA, or initiating cell reselection or handover to a different base station 14 (e.g., such that the intended receiver of the UE 12-2 changes). In some alternative embodiments, in response to determining that the transmission from the other UE 12-1 would be subject to too large interference, the UE 12-2 may still decide to transmit on the unlicensed channel (s), but reduce its transmit power such that the SINR of the transmission from the other UE 12-1 to its desired receiver is acceptable. Parameters related to the UE's 12-2 own transmission, such as the coding and modulation scheme, may then need to be adjusted to account for the reduction in transmit power.

Figure 6:
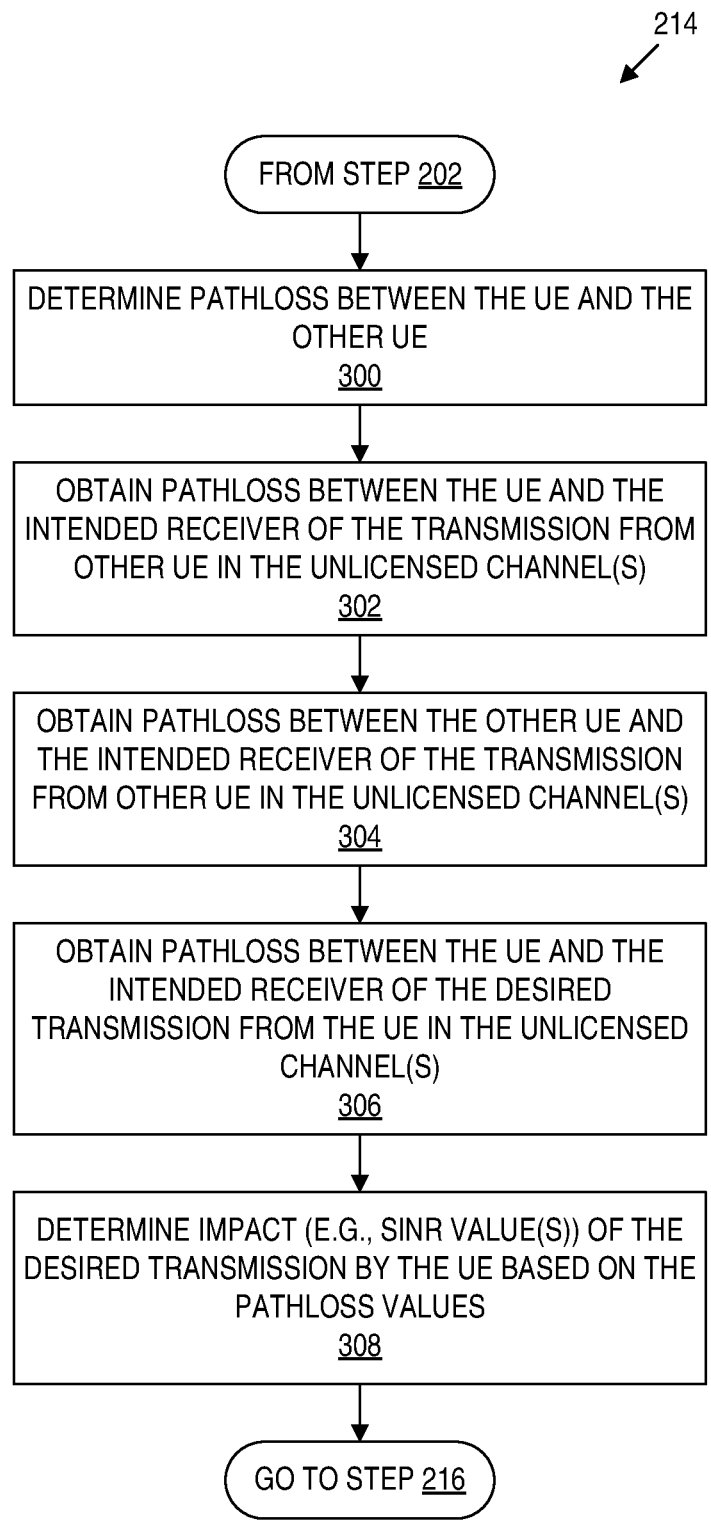
FIG. 6 illustrates one example of determining the impact of the transmission by the wireless device in FIG. 5 according to some embodiments of the present disclosure.

FIG. 6 is a flow chart that illustrates step 214 of FIG. 5 in more detail according to some embodiments of the present disclosure. Note that while a number of different pathlosses are determined or otherwise obtained in this example, the UE 12-2 may alternatively obtain and use any one or more of these pathlosses. As illustrated, the UE 12-2 determines, or otherwise obtains, a pathloss between the UE 12-2 and the other UE 12-1 from which the start transmitting message was received (step 300). This UE-to-UE pathloss could be used for example to, in combination with the UE's 12-2 own pathloss estimates, get a crude estimate of the pathloss between the other UE 12-1 and the base stations 14-1 and 14-2 in case these are not known. Other information (e.g., positions, distance information) may be used alternatively or additionally to obtain/refine the pathloss estimates. The UE 12-2 may determine the pathloss between itself and the other UE 12-1 using any appropriate technique. The pathloss may, for example, be estimated using known techniques by measuring the received signal strength for the discovery or reference signals, and compare this with a known, signaled, assumed, estimated, or otherwise obtained value of the transmitted discovery or reference signal power. Note that the UE 12-2 may already have this pathloss value. In other words, the UE 12-2 may have already determined this pathloss value prior to performing the SLA-CCA procedure as a result, e.g., of normal D2D operation.

The UE 12-2 also obtains a pathloss between the UE 12-2 and the intended receiver of the transmission from the other UE 12-1 in the unlicensed channel(s) (step 302). The UE 12-2 may determine this pathloss by, for example, measuring the pathloss using discovery signals or reference signals transmitted by the intended receiver. Again, the UE 12-2 may already have this pathloss value. In other words, the UE 12-2 may have already determined this pathloss value prior to performing the SLA-CCA procedure for another purpose (e.g., handover).

The UE 12-2 also obtains a pathloss between the other UE 12-1 (i.e., the UE 12-1 from which the start transmitting message was received via the D2D SL) and the intended receiver of the transmission on the unlicensed channel(s) by the other UE 12-1 (step 304). The UE 12-2 may obtain this information from the other UE 12-1. For example, the start transmitting message may include the pathloss between the other UE 12-1 and the intended receiver of the transmission on the unlicensed channel(s) by the other UE 12-1. The UE 12-2 also obtains a pathloss between the UE 12-2 and the intended receiver of the desired transmission by the UE 12-2 on the unlicensed channel(s) (step 306). The UE 12-2 may determine this pathloss by, for example, measuring the pathloss using discovery signals or reference signals transmitted by the intended receiver.

The UE 12-2 determines the impact(s) related to transmission by the UE 12-2 on the unlicensed channel(s) based on the pathloss values obtained in steps 300 to 306 (step 308). As discussed above, the impact(s) may include: (A) an impact of a transmission by the UE 12-2 on the unlicensed channel(s) on reception of the other UE's 12-1 (i.e., the other UE 12-1 from which the start transmitting message was received) transmission on the unlicensed channel(s) at the intended receiver of that transmission (i.e., the degree to which the UE's 12-2 transmission will interfere with reception of the other UE's 12-1 transmission) and/or (B) an impact of the transmission by the other UE 12-1 on the unlicensed channel(s) on reception of the transmission by the UE 12-2 on the unlicensed channel(s) at the intended receiver of the transmission of the UE 12-2 (e.g., the degree to which the transmission by the other UE 12-1 will interfere with reception of the UE's 12-2 own transmission). The impacts in both (A) and (B) may be expressed as estimated SINR values that take into account a transmission by the UE 12-2 on the unlicensed channel (i.e., SINR values if the UE 12-2 were to transmit on the unlicensed channel(s)). In general, to compute or rather estimate the SINR values from the pathloss values, an assumption on the transmit power levels is made. This can be thought of as a "reference SINR" associated with that set of pathloss values assuming some reference power levels. If, for example, the aforementioned pathloss values between the UEs 12-1 and 12-2 and the intended receivers have been obtained, and values for the UE transmit powers are known or can be assumed, the SINR at the intended receiver can be estimated from the relation between the received power from each UE 12-1, 12-2 at the respective receiver.

Figure 7:
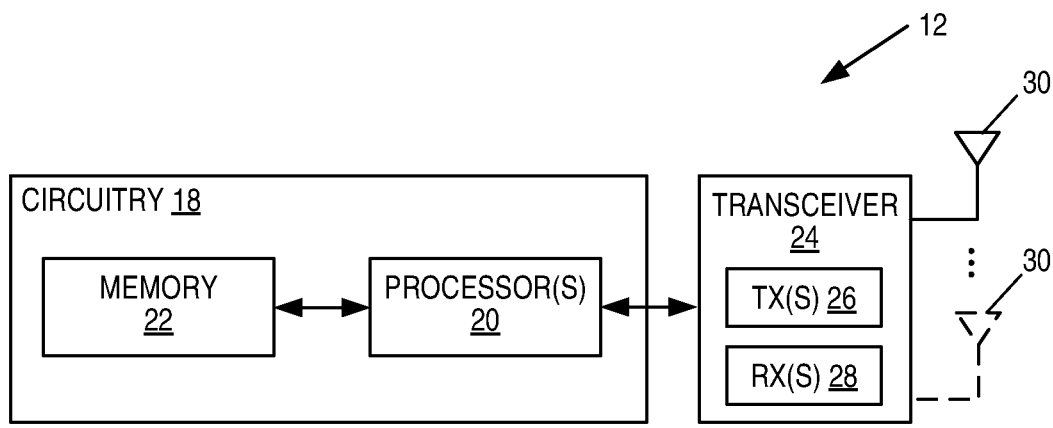
FIGS. 7 and 8 are block diagrams of a wireless device according to some embodiments of the present disclosure.

FIG. 7 is a schematic block diagram of the UE 12, or more generally a wireless device which may also be referred to herein as a wireless device 12, according to some embodiments of the present disclosure. As illustrated, the UE 12 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The UE 12 also includes one or more transceivers 24 each including one or more transmitters 26 and one or more receivers 28 coupled to one or more antennas 30. In some embodiments, the functionality of the UE 12 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the UE 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
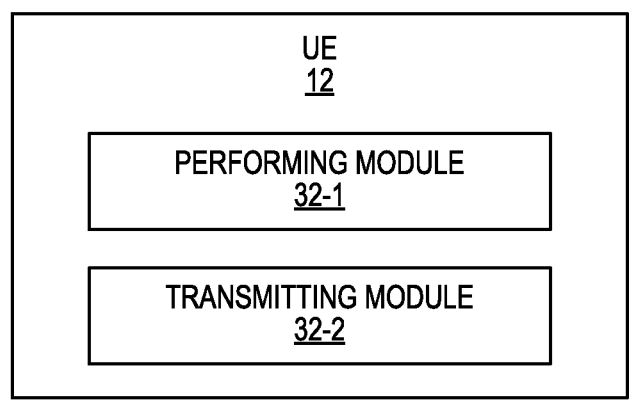

FIG. 8 is a schematic block diagram of the UE 12, or more generally a wireless device which may also be referred to herein as a wireless device 12, according to some other embodiments of the present disclosure. The UE 12 includes one or more modules 32, each of which is implemented in software. The module(s) 32 provide the functionality of the wireless device 12 (e.g., UE) described herein. In this example, the UE 12 includes a performing module 32-1 operable to perform a SLA-CCA procedure to determine whether to transmit on an unlicensed channel, as described above. The SLA-CCA procedure is a CCA procedure that is assisted by information received by the wireless device 12 from one or more other wireless devices 12 over a D2D SL in a licensed spectrum. The UE 12 also includes a transmitting module 32-2 operable to, upon determining to transmit on the unlicensed channel as a result of performing the SLA-CCA procedure, transmit a transmission on the unlicensed channel (e.g., via an associated transmitter of the UE 12, which is not shown).

Figure 9:
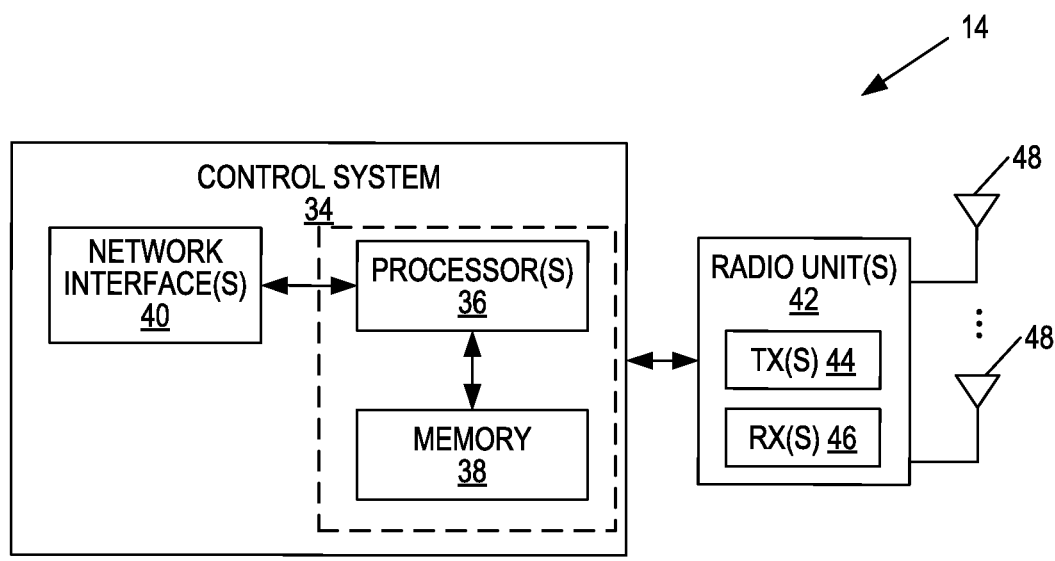
FIGS. 9 through 11 are block diagram of a radio access node according to some embodiments of the present disclosure.

FIG. 9 is a schematic block diagram of the base station 14, or more generally a radio access node which is also referred to herein as radio access node 14, according to some embodiments of the present disclosure. Other types of network nodes may have similar architectures, particularly with respect to including processor(s), memory, and a network interface. As illustrated, the base station 14 includes a control system 34 that includes circuitry comprising one or more processors 36 (e.g., CPUs, ASICs, FPGAs, and/or the like) and memory 38. The control system 34 also includes a network interface 40. The base station 14 also includes one or more radio units 42 that each includes one or more transmitters 44 and one or more receivers 46 coupled to one or more antennas 48. In some embodiments, the functionality of the base station 14 described above may be fully or partially implemented in software that is, e.g., stored in the memory 38 and executed by the processor(s) 36.

Figure 10:
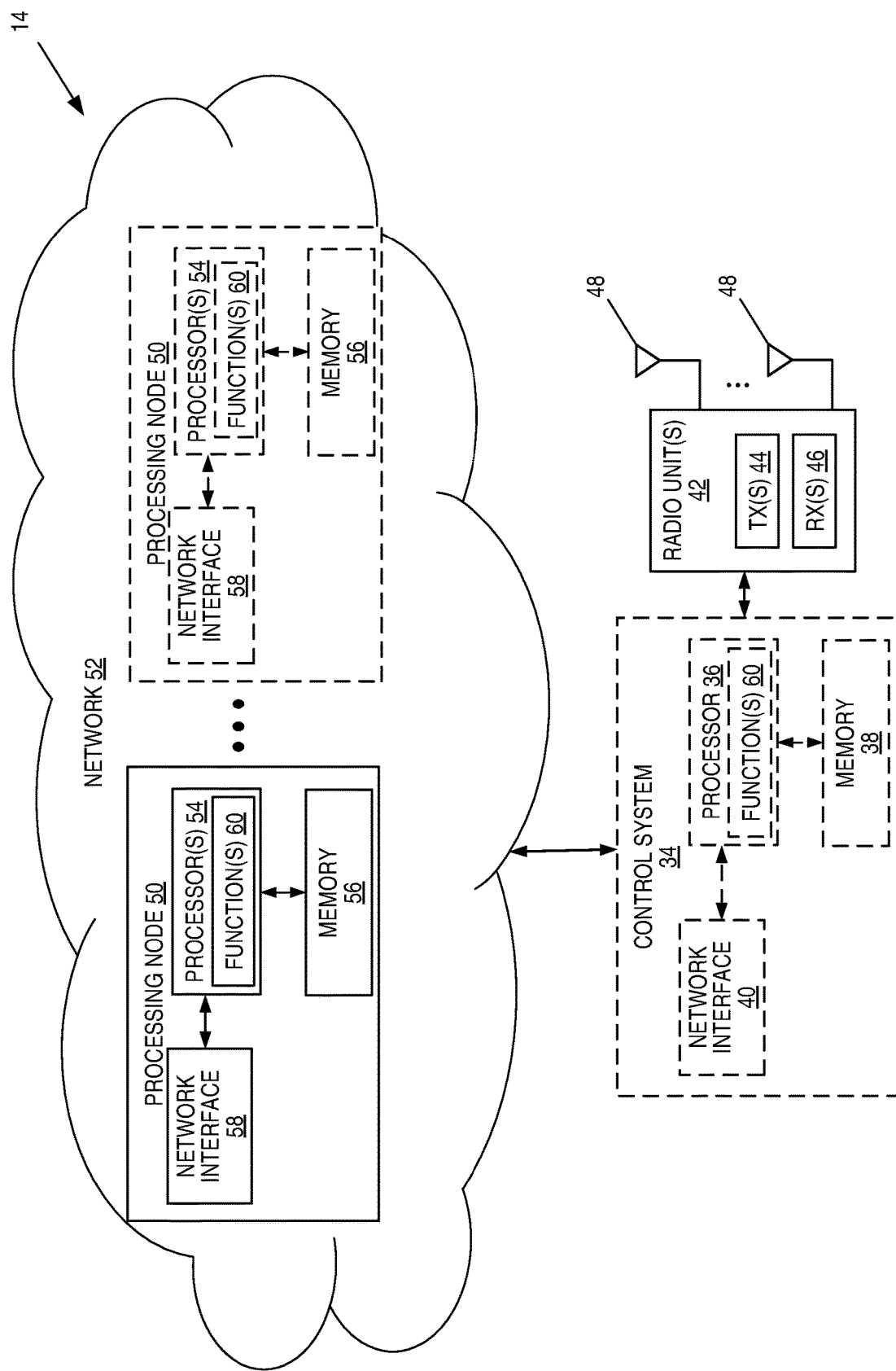

FIG. 10 is a schematic block diagram that illustrates a virtualized embodiment of the base station 14 according to some embodiments of the present disclosure. Other types of network nodes may have similar architectures (particularly with respect to including processor(s), memory, and a network interface).

As used herein, a "virtualized" base station 14 is a base station 14 in which at least a portion of the functionality of the base station 14 is implemented as a virtual component (e.g., via a virtual machine(s) executing on a physical processing node(s) in a network(s)). As illustrated, the base station 14 optionally includes the control system 34, as described with respect to FIG. 9. The base station 14 also includes the one or more radio units 42 that each includes the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the base station 14 described herein are implemented at the one or more processing nodes 50 or distributed across the control system 34 (if present) and the one or more processing nodes 50 in any desired manner. In some particular embodiments, some or all of the functions 60 of the base station 14 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicate directly with the processing node(s) 50 via an appropriate network interface(s).

In some embodiments, a computer program including instructions which, when executed by at least one processor, causes the at least one processor to carry out the functionality of the base station 14 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 11:
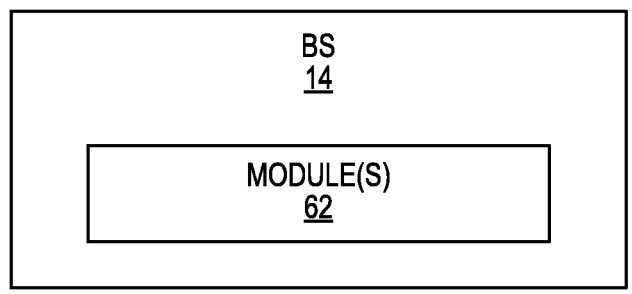

FIG. 11 is a schematic block diagram of the base station 14, or more generally a radio access node which is also referred to herein as radio access node 14, according to some other embodiments of the present disclosure. The base station 14 includes one or more modules 62, each of which is implemented in software. The module(s) 62 provide the functionality of the radio access node 14 described herein.

While not being limited thereto, some exemplary advantages of embodiments disclosed herein include:

At least some embodiments take advantage of the standard SL procedures to enable a UE 12 to assess the geometry of the system and distribute information about an ongoing or imminent transmission in the unlicensed band;

At least some embodiments mitigate the hidden node and exposed node problems, although they may not eliminate these problems. Mitigation means that a node can better assess whether it can transmit or not;

At least some embodiments increase the throughput and stability that can be achieved in the unlicensed spectrum; and At least some embodiments improve the utilization of unlicensed spectrum as compared with systems using existing technology to control the medium access of unlicensed resources.

The following acronyms are used throughout this disclosure.

3GPP Third Generation Partnership Project
5G Fifth Generation
ASIC Application Specific Integrated Circuit
CA Carrier Aggregation
CCA Clear Channel Assessment
CN Core Network
CPU Central Processing Unit
CS Carrier Sensing
CSMA Carrier Sense Multiple Access
CTS Clear to Send
D2D Device-to-Device
dB Decibel
eNB Enhanced or Evolved Node B
FPGA Field Programmable Gate Array
LAA License Assisted Access
LBT Listen-Before-Talk
LTE Long Term Evolution
LTE-U Long Term Evolution in the Unlicensed Band
MAC Medium Access Control
MME Mobility Management Entity
MTC Machine Type Communication
PCell Primary Cell
PDN Packet Data Network
P-GW Packet Data Network Gateway
PHY Physical Layer
ProSe Proximity Services
PSBCH Physical Layer Sidelink Broadcast Channel
PSSCH Physical Layer Sidelink Shared Channel
RAT Radio Access Technology
RSSI Received Signal Strength Indicator
RTS Ready to Send
SCEF Service Capability Exposure Function
SCell Secondary Cell
SFN System Frame Number
SINR Signal to Interference plus Noise Ratio
SL Sidelink
SLA-CCA Sidelink-Assisted Clear Channel Assessment
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, comprising:

performing a sidelink-assisted clear channel assessment (SLA-CCA) procedure to determine whether to transmit on an unlicensed channel, the SLA-CCA procedure being a Clear Channel Assessment (CCA) procedure that is assisted by information received by the wireless device from one or more other wireless devices over a Device-to-Device (D2D) sidelink in a licensed spectrum;

upon determining to transmit on the unlicensed channel as a result of performing the SLA-CCA procedure, transmitting a transmission on the unlicensed channel; and transmitting a message on a D2D sidelink, the message comprising an indication that the wireless device is using the unlicensed channel, wherein the message further comprises:
- an indication of an intended receiver that receives the transmission by the wireless device in the unlicensed channel; and
- an estimate of a pathloss between the wireless device and the intended receiver.

2. The method of claim 1, wherein the message comprises at least one of the following:
- a status of the unlicensed channel as sensed by the wireless device;
- an indication of a maximum power at which the wireless device will transmit for the transmission on the unlicensed channel;
- a synchronization or reference signal;
- a persistency level that the wireless device uses for CCA;
- an indication of a duration of the transmission by the wireless device on the unlicensed channel;
- a packet length for the transmission by the wireless device on the unlicensed channel; and
- a position of the wireless device.

3. The method of claim 1, further comprising upon determining not to transmit on the unlicensed channel as a result of performing the SLA-CCA procedure, refraining from transmitting on the unlicensed channel.

4. The method of claim 1, wherein performing the SLA-CCA procedure comprises:
- attempting to detect a message from another wireless device on the D2D sidelink that indicates that another wireless device is using the unlicensed channel;
- upon detecting a message from another wireless device on the D2D sidelink, determining at least one impact related to transmission on the unlicensed channel by the wireless device, the at least one impact being at least one of the following:
  - an impact of transmission on the unlicensed channel by the wireless device on reception of a transmission on the unlicensed channel by the other wireless device at an intended receiver of the transmission by the other wireless device, and
  - an impact of the transmission on the unlicensed channel by the other wireless device indicated by the detected message on reception of a transmission on the unlicensed channel by the wireless device at an intended receiver of the transmission by the wireless device; and
- determining whether the at least one impact is less than a predefined or preconfigured threshold such that the wireless device determines to transmit in the unlicensed channel upon determining that the at least one impact is less than the predefined or preconfigured threshold.

5. The method of claim 4, wherein performing the SLA-CCA procedure further comprises, upon not detecting a message from another wireless device on the D2D sidelink:
- performing a CCA on the unlicensed channel; and
- determining, based on a result of the CCA, whether the unlicensed channel is clear such the wireless device determines to transmit in the unlicensed channel upon determining that the unlicensed channel is clear.

6. The method of claim 4, wherein determining the at least one impact comprises:
- determining or obtaining at least one of the following:
  - a first pathloss between the wireless device and the other wireless device on the unlicensed channel,
  - a second pathloss between the wireless device and the intended receiver of the transmission from the other wireless device in the unlicensed channel,
  - a third pathloss between the other wireless device and the intended receiver of the transmission from the other wireless device in the unlicensed channel, and
  - a fourth pathloss between the wireless device and the intended receiver of the transmission from the wireless device in the unlicensed channel; and
- determining the at last one impact related to transmission on the unlicensed channel by the wireless device based on the at least one of the first pathloss, the second pathloss, the third pathloss, and the fourth pathloss.

7. The method of claim 4, further comprising, upon determining that the at least one impact is not below the predefined or preconfigured threshold, refraining from transmitting the transmission on the unlicensed channel.

8. The method of claim 7, further comprising, upon determining that the at least one impact is not below than the predefined or preconfigured threshold, taking one or more further actions, the one or more further actions comprising at least one of the following:
- requesting that the other wireless device reduce its transmit power;
- requesting that the other wireless device reduce its persistency level; and
- initiating a cell reselection or handover for the wireless device.

9. A non-transitory, computer-readable medium storing computer-executable instructions that, when executed by at least one processor comprising a wireless device, configure the wireless device to perform operations corresponding to the method of claim 1.

10. A wireless device for a cellular communications network, comprising:
- a transceiver;
- at least one processor operably coupled to the transceiver; and
- memory comprising instructions executable by the at least one processor whereby the wireless device is configured to:
  - perform a sidelink-assisted clear channel assessment (SLA-CCA) procedure to determine whether to transmit on an unlicensed channel, the SLA-CCA procedure being a Clear Channel Assessment (CCA) procedure that is assisted by information received by the wireless device from one or more other wireless devices over a Device-to-Device (D2D) sidelink in a licensed spectrum;
  - upon determining to transmit on the unlicensed channel as a result of performing the SLA-CCA procedure, transmit a transmission on the unlicensed channel; and
  - transmit a message on a D2D sidelink, the message comprising an indication that the wireless device is using the unlicensed channel,
  - wherein the message further comprises:
    - an indication of an intended receiver that receives the transmission by the wireless device in the unlicensed channel; and
    - an estimate of a pathloss between the wireless device and the intended receiver.

11. The wireless device of claim 10, wherein the message comprises at least one of the following:

a status of the unlicensed channel as sensed by the wireless device;

an indication of a maximum power at which the wireless device will transmit for the transmission on the unlicensed channel;

a synchronization or reference signal;

a persistency level that the wireless device uses for CCA;

an indication of a duration of the transmission by the wireless device on the unlicensed channel;

a packet length for the transmission by the wireless device on the unlicensed channel; and a position of the wireless device.

12. The wireless device of claim 10, wherein execution of the instructions that configure the wireless device to perform the SLA-CCA procedure further configures the wireless device to:

attempt to detect a message from another wireless device on the D2D sidelink that indicates that another wireless device is using the unlicensed channel;

upon detecting a message from another wireless device on the D2D sidelink, determine at least one impact related to transmission on the unlicensed channel by the wireless device, the at least one impact being at least one of the following:

an impact of transmission on the unlicensed channel by the wireless device on reception of a transmission on the unlicensed channel by the other wireless device at an intended receiver of the transmission by the other wireless device, and an impact of the transmission on the unlicensed channel by the other wireless device indicated by the detected message on reception of a transmission on the unlicensed channel by the wireless device at an intended receiver of the transmission by the wireless device; and determine whether the at least one impact is less than a predefined or preconfigured threshold such that the wireless device determines to transmit in the unlicensed channel upon determining that the at least one impact is less than the predefined or preconfigured threshold.

13. The wireless device of claim 12, wherein execution of the instructions that configure the wireless device to perform the SLA-CCA procedure further configures the wireless device to, upon not detecting a message from another wireless device on the D2D sidelink:

perform a CCA on the unlicensed channel; and determine, based on a result of the CCA, whether the unlicensed channel is clear such the wireless device determines to transmit in the unlicensed channel upon determining that the unlicensed channel is clear.

14. The wireless device of claim 12, wherein execution of the instructions that configure the wireless device to determine the at least one impact further configure the wireless device to:

determine or obtain at least one of the following:

a first pathloss between the wireless device and the other wireless device on the unlicensed channel, a second pathloss between the wireless device and the intended receiver of the transmission from the other wireless device in the unlicensed channel, a third pathloss between the other wireless device and the intended receiver of the transmission from the other wireless device in the unlicensed channel, and a fourth pathloss between the wireless device and the intended receiver of the transmission from the wireless device in the unlicensed channel; and determine the at least one impact related to transmission on the unlicensed channel by the wireless device based on the at least one of the first pathloss, the second pathloss, the third pathloss, and the fourth pathloss.

15. The wireless device of claim 12, wherein, by execution of the instructions further configures the wireless device to, upon determining that the at least one impact is not less than the predefined or preconfigured threshold, refrain from transmitting the transmission on the unlicensed channel.

\* \* \* \* \*